(No Model.)
D. GINGRICH.
HARVESTER REEL.
No. 320,927. Patented June 30, 1885.
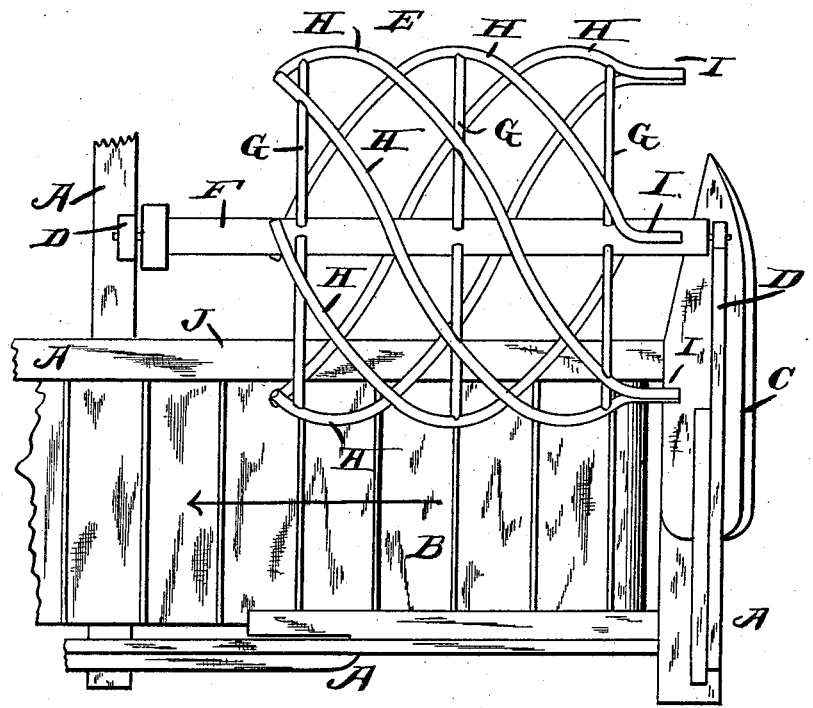
Witnesses: Daniel Gingrich  Inventor
W. A. Seward.
John R. Woods  by James W. See  Attorney
N. PETERS, Photo-Lithographer, Washington, D. C.

United States Patent Office.

DANIEL GINGRICH, OF OVERPECK, OHIO.

HARVESTER-REEL.

SPECIFICATION forming part of Letters Patent No. 320,927, dated June 30, 1885.

Application filed August 9, 1884. (No model.)

*To all whom it may concern:*

Be it known that I, DANIEL GINGRICH, of Overpeck, Butler county, Ohio, have invented certain new and useful Improvements in Harvester-Reels, of which the following is a specification.

In modern self-binding reaping-machines, in which the cut grain falls upon a platform formed by an endless apron which carries the grain to the elevator and binding apparatus, there is a constant tendency for the cut grain to be carried imperfectly by the platform-apron. It is found that the apron moves the heads of the grain faster than the butts, and, therefore, delivers the grain angularly to the elevator, resulting in more or less tangle at the binding apparatus.

My invention relates to such construction and arrangement of the harvester-reel, in combination with the traveling platform of the harvester, as will cause the grain to be delivered squarely to the elevator and binding apparatus.

The invention will be understood from the following description, taken in connection with the accompanying drawing, which is a plan view of a portion of a harvester of the class referred to, illustrating my improvements.

In the drawing, A represents portions of the frame-work of a harvester of ordinary construction; B, the apron forming the traveling platform on which the grain falls as it is cut, and by which the grain is carried in the direction of the arrow to the elevating and binding apparatus; C, the usual divider; D, the usual bearing-supports for the reel; E, the reel of peculiar construction, as hereinafter described; F, the usual reel-shaft; G, the usual spiders of the reel; H, the ribs of the reel arranged helically; I, portions of the reel-ribs nearest the divider, arranged parallel to the axis of the reel, and J, the usual position of the cutting apparatus. (Not shown in the drawing.)

The helical reel is operated the same as the ordinary reel, and its effect is to cause the grain to fall upon the apron in an oblique position, with the butts of the grain in advance of the heads. The tendency of the apron being to carry the heads forward more rapidly than the butts, the grain will reach the elevator and binding apparatus in proper condition; in other words, the erratic tendency of the apron is compensated for by delivering the grain to it in an erroneous position having a counter direction.

It is not desirable that the grain be delivered obliquely to the apron near the divider, on account of the tendency of such oblique delivery at that point to result in tangles at the divider; hence the reel has its ribs parallel near the divider, as indicated at I. The result of this arrangement is that the portions I of the reel-ribs deliver a little of the grain squarely upon the apron, and as this squarely-laid grain is carried along by the apron, there becomes superposed upon it, grain delivered obliquely by the helical portion of the reel.

Efforts have been heretofore made to produce the result referred to by setting the axis of the reel oblique to the path of travel of the apron, but these efforts have been futile. Attempts have also been made to accomplish the purpose by dividing the reel-shaft at its center, and then twisting one portion in an angular advance of the other portion, the parallel ribs of the reel being thereby advanced a trifle at one end. This method also proved useless, owing to the fact that the angular advance of one end of the ribs deprived the reel of its cylindricity, the diameter of the reel becoming lessened in the center. In my reel the form of revolution is a true cylinder.

The helical angle at which the ribs of my reel are applied should be such that the circumferential advance of the ribs exceeds the longitudinal advance, as indicated in the drawing. By this means the surface of the ribs is presented to the grain at an angle calculated to glide past the grain and push it sidewise. Should the helix be too great a pitch—that is, too great a relative longitudinal advance—there would be a tendency of the grain to refuse to glide, in which case the reel is apt to act upon the grain as a mere element of revolution.

In the construction of this reel it is desirable that there be three or more spiders whose arms are arranged at the proper relative angular advance to each other, the ribs being constructed of light flexible strips of wood or wire, arranged as helical elements of a cylinder, and secured to the ends of the arms.

I claim as my invention—

1. In a harvester, the combination of a platform-carrier, the reel-axis parallel to the path thereof, reel-ribs arranged helically with a circumferential advance exceeding the longitudinal advance, and terminating portions of the reel-ribs arranged parallel to the axis of the reel.

2. In a harvester, the combination of a platform-carrier, the reel-axis parallel with the path thereof, reel-ribs arranged helically, and terminating portions of the reel-ribs arranged parallel with the axis of the reel.

DANIEL GINGRICH.

Witnesses:
J. W. SEE,
W. A. SEWARD.